Sept. 28, 1926.
J. T. PEARSON ET AL
1,601,083
COVER FOR ELECTRIC CONDUIT OUTLET BOXES
Original Filed April 17, 1922
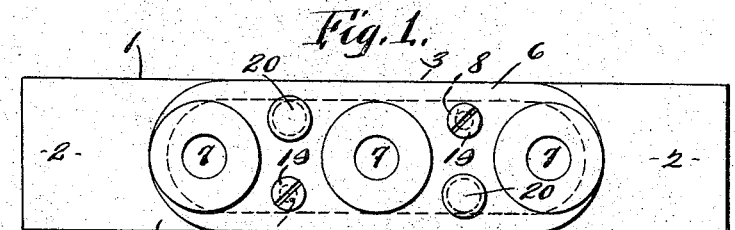
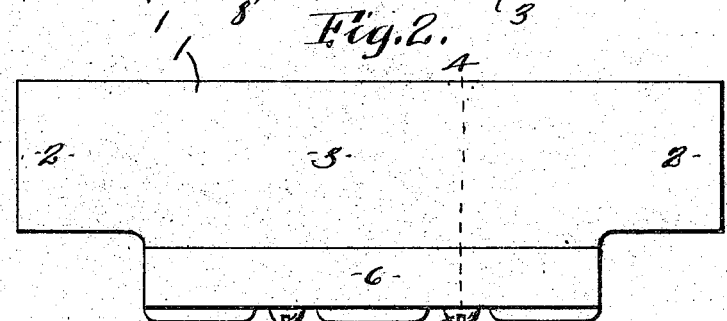
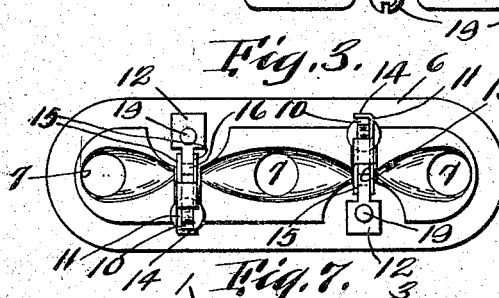 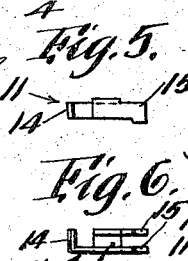 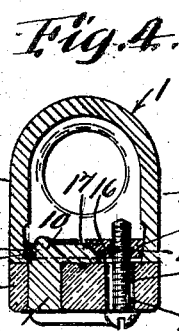
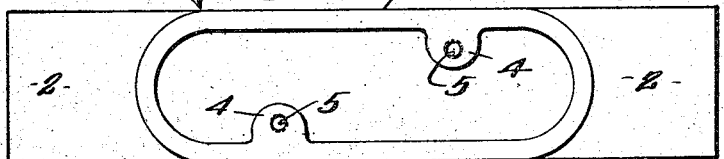
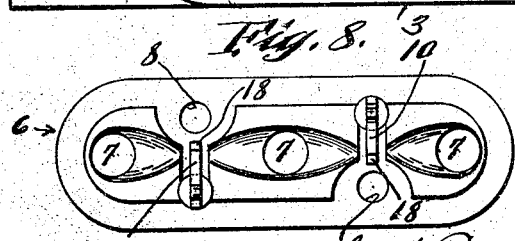 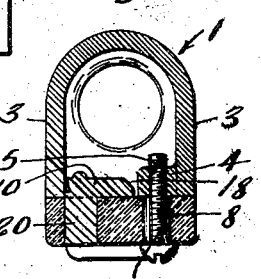
John T. Pearson and Raymond H. Alley
INVENTORS
BY
Parsons & Bodell
ATTORNEYS Patented Sept. 28, 1926.

1,601,083

UNITED STATES PATENT OFFICE.

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK.

COVER FOR ELECTRIC CONDUIT OUTLET BOXES.

Application filed April 17, 1922, Serial No. 553,787. Renewed July 21, 1924.

This invention relates to covers for conduit outlet boxes and has for its object a cover having a particularly simple and efficient means for attaching it to the boxes, by which means the cover is attachable upon either the type of conduit outlet box having inwardly projecting lugs at the open side thereof, which lugs are formed with screw holes for receiving screws passing through the cover, or onto the type of boxes unprovided with such lugs or screw holes.

The invention consists in the novel features and in the combinations and constructions hereinafter set forth and claimed.
In describing this invention, reference is had to the accompanying drawings, in which like characters designate corresponding parts in all the views.

Figure 1 is a plan view of one form of cover attached to a conduit outlet box.

Figure 2 is an elevation of parts seen in Figure 1.

Figure 3 is an inverted plan view of the cover.
Figure 4 is a sectional view on line 4—4, Figure 2.

Figures 5 and 6 are respectively an elevation and an inverted plan view of the extension or adapter member.
Figure 7 is a plan view of the conduit outlet box provided with lugs formed with screw holes to which lugs the cover is attachable.

Figure 8 is a view similar to Figure 3, showing the extension member of the attaching means removed so that the cover can be applied to the type of outlet box shown in Figure 7.

Figure 9 is a view similar to Figure 4, showing the cover applied to the type of outlet box shown in Figure 7.

This invention comprises a cover for electric conduit outlet boxes having an opening in one side of the type formed with lugs projecting into the box at the open side and formed with screw holes and of the type unprovided with such lugs, the cover having holes in its margin for screws passing through such holes and entering the holes of the threaded lugs when the cover is applied to the boxes of the first type and the cover also having self-contained means for attaching the cover to boxes of the second-mentioned type, which means includes a clamping member operable to bind opposite portions of the attaching means on the walls of the boxes, which member is operable by screws passing through the same screw holes used for attaching the cover to boxes of the first type.

1 designates the conduit outlet box, which is provided with an elongated opening in one side and with one or more nipples 2 for connection in the electric conduit system. These boxes are usually narrow and have flat parallel side walls 3.

One type of such boxes is provided with inwardly extending lugs 4, Figure 7, formed with screw holes 5, these lugs projecting inwardly from the opposite walls 3 of the boxes, and being usually obliquely or diagonally arranged relatively to each other.

Another type of box is unprovided with such lugs 4.

6 designates the cover which may be of any suitable form, size and construction to cover the hole or open side of the conduit outlet box, such cover may be formed of metal or insulating material, as composition or porcelain. The cover here shown is formed of insulation and provided with one or more passages 7 for the outlet of the electric wires. The cover is also formed with screw holes 8 arranged to be brought into alinement with the holes 5 of the lugs 4, so that the cover can be secured to boxes of the type having the lugs 4 by means of screws as 9 passing through the holes 8 and threading into the holes 5 in the lug.

The means by which the cover is attachable not only to boxes of the type having the lugs 4 but also of boxes of the type unprovided with lugs or screw holes, comprises wedge members operable by screws passing through the holes 8 and threading into such members for wedging said members against the inner faces of the walls of the box and thrusting the cover so that other parts of said means bind against the opposite sides of the boxes from those sides engaged by said wedging members.

The means here illustrated comprises a strip 10 fixed to the inner face of the cover and extending transversely thereof in line with one of the openings 8 and being spaced apart from the side edges of the cover and also from the holes 8, far enough so as not to engage with the wall of the box or interfere with the screw when the cover is applied to a box having lugs. Said means further comprises an extension member 11 mountable upon the strip 10 and extending beyond one end thereof into position to form a shoulder to engage the inner face of the wall of the box, as at 11ª, a wedge member or nut 12 coacting with the other end of the strip and forming an extension of the strip so that the combined length of the strip, shoulder and nut is sufficient, on tightening of the nut, to bind the shoulder against one side wall 3 of the box and the nut against the other side wall and a screw extending through the hole 8 and threading into the nut. This extension 11, as seen in Figures 5 and 6, is folded up from sheet metal to form a channel 13 which fits the strip 10 when arranged astride the strip, and the extension having an angular end 14 extending across one end of the strip and forming the shoulder for abutting against one side wall of the box and extending the strip sufficiently to fill up the normal clearance between the strip and such side wall of the box.

This extension 11 is also provided with arms 15 extending beyond the end of the strip toward the hole 8 for receiving the contiguous portion 16 of the nut and holding the nut from turning. The portion 16 of the nut and the end of the strip 10 are formed with inclined cam faces 17, 18, which act on each other in an inclined plane fashion when the nut is tightened by turning of the screw 19. The screw 19 extends through one of the holes 8.

In use, the covers are supplied with the strips 10 permanently secured thereto, extensions 11, nuts 12 and screws 19. If the cover is to be applied to the type of box having no lugs, the cover is placed without change on the box, and the screws 19 tightened so that the inclined faces of the nut sliding along the inclined face of the strip 10 forces the nut laterally against the inner face of the side wall 3 of the box and also thrusts the cover laterally in the opposite direction so that the shoulders 14 of the extension member bind on the opposite side of the box.

As the covers are elongated, there are preferably a plurality of self-contained attaching means spaced apart on its inner face, each of which means includes a strip 10, extension member 11, nut 12 and screw 19.

The opposite margins of the walls of the box are under-bevelled and the nuts 12 and shoulders 14 correspondingly bevelled so that the shoulders and nut interlock with these sides when the screw 19 is tightened rather than merely frictionally bind on the sides of the box. When the cover is to be applied to a box of the type having lugs 4, the extension members 11 are removed from the strips 10 and also the nuts 12 removed from the screw, and the screw placed through the openings 8 in the cover and threaded into the lugs 4. The openings 8 of the screws are large enough to permit movement of the nut without tilting of the nut or the screw.

The strips 10 are secured to the cover in any suitable manner and as here shown is partially embedded in the cover and formed with angular arms 20 extending and embedded in the cover.

Obviously, by this cover and attaching means, the cover is attachable to either type of outlet box.

What we claim is:

1. A cover for electric conduit outlet boxes of the type having an opening in one side and lugs projecting into the box at the open side and formed with screw holes and for the type unprovided with such lugs, the cover having holes for receiving screws for entering the holes of the lugs of the first type of boxes and means carried by the cover for attaching the cover to boxes of the second type, such means including members extending through the screw holes of the cover, substantially as and for the purpose specified.

2. A cover for electric conduit outlet boxes of the type having an opening in one side and lugs projecting into the box at the open side and formed with screw holes and for the type unprovided with such lugs, the cover having holes for receiving screws for entering the holes of the first type of boxes, and means carried by the cover for attaching the cover to boxes of the second type, such means including members extending through the screw holes of the cover, and wedge means carried on the inner side of the cover and operable by said members to engage the opposite walls of the box, substantially as and for the purpose described.

3. A cover for electric conduit outlet boxes of the type having an opening in one side and lugs projecting into the box at the open side and formed with screw holes and for the type unprovided with such lugs, the cover having holes through its margin for receiving screws for entering the holes of the first type of boxes and detachable shoulders on the inner side of the cover and each located on the opposite margin of the cover from that on which one of the holes is located, nuts having their threaded holes alined with the holes of the cover, means on the inner face of the cover for detachably mounting the shoulders on the inner face of the cover and for coacting with the nuts to wedge the nuts outwardly when the nuts are moved toward the cover, and screws extending through the holes in the cover and threading into the nuts, substantially as and for the purpose set forth.

4. A cover for electric conduit outlet boxes of the type having an opening in one side and lugs projecting into the box at the open side and formed with screw holes and for the type unprovided with such lugs, the cover having holes for receiving screws for entering the holes of the first type of boxes, a strip extending transversely of the cover, and fixed thereto in line with and spaced from one of said holes of the cover and from the edge of the cover, an extension member formed with means for detachably engaging the strip having a shoulder at one end of the strip constituting an extension of the strip toward the edge of the cover opposite the margin formed with the screw hole, a nut at the other end of the strip and arranged with its threaded hole in line with one of the holes on the cover, and a screw extending through the hole of the cover and threading into the nut, the nut and strip having coacting cam faces for wedging the nut outwardly when the screw is tightened, substantially as and for the purpose described.

5. A cover for electric conduit outlet boxes of the type having an opening in one side and lugs projecting into the box at the open side and formed with screw holes and for the type unprovided with such lugs, the cover having holes for receiving screws for entering the holes of the first type of boxes, strips extending transversely of the cover and fixed thereto, in line with and spaced from said holes of the cover, an extension member formed with means for detachably engaging each strip and having a shoulder at one end of such strip constituting an extension of the strip toward the edge of the cover opposite the margin formed with the screw holes, said member also having an extension projecting beyond the other end of the strip toward the hole in the cover, a nut at such end of each strip and arranged with its threaded hole in line with one of the holes in the cover, the nut and said member interlocking, whereby the nut is held from turning and a screw extending through the hole in the cover and threading into the nut, the nut and the strip having coacting cam faces for wedging the nut outwardly when the screw is tightened, substantially as and for the purpose specified.

6. A cover for electric conduit outlet boxes of the type having an opening in one side and lugs projecting into the box at the open side and formed with screw holes and for the type unprovided with such lugs, the cover having holes therethrough for receiving screws for entering the holes in the lugs of the first type of boxes, strips fixed to the inner face of the cover and extending transversely thereof, substantially in line with the holes of the cover and an adapter detachably mountable on each strip to project from the end of each strip toward a side edge of the cover and form a shoulder, and a movable locking member coacting with the other end of each strip, said member and such end of the strip having coacting cam faces whereby said member is extended toward the opposite side edge of the cover when said member is moved toward the cover and a screw extending through the hole in the cover and threading into said member, substantially as and for the purpose set forth.

7. A cover for electric conduit outlet boxes of the type having an opening in one side and lugs formed with screw holes projecting into the opening at the open side and of the type unprovided with such lugs and screw holes, the cover having holes for receiving screws for entering the holes in the first type of boxes, a strip on its inner face adjacent a screw hole and extending transversely of the cover, a detachable extension mountable on the strip to extend the length thereof toward one margin of the cover remote from the hole, a nut forming an extension on the strip at the other end, the nut and strip having coacting cam faces whereby upon tightening of the nut, the nut is extended relatively to the strip and a screw extending through the hole in the cover and threading into the nut, substantially as and for the purpose described.

8. A cover for electric conduit outlet boxes of the type having internal lugs formed with screw holes, and of the type unprovided with lugs, said cover having screw holes therethrough for fastening screws for threading into the lugs of boxes of the former type, and removable means on the inner side of the cover for cooperating with screws in said holes and engaging the side walls of boxes of the latter type in locking contact.

9. A cover for conduit outlet boxes of the type formed with internal lugs having threaded holes and of the type unprovided with lugs, the cover having screw holes therethrough for fastening screws for threading into the lugs of boxes of the former type, and rigid means secured thereto on its inner face adjacent to said holes, fastening screws for extending through the holes and threading into the lugs of the boxes of the former type, and removable means mountable on said rigid means, and including a nut constituting a wedge adapted to receive a screw in the adjacent hole and operable to engage the inner face of the wall of the boxes of the second type in locking contact upon tightening of the screw, the nut and said rigid means having faces acting inclined plane fashion to wedge the nut laterally.

10. A cover for outlet boxes having screw holes therethrough, fastening screws, transverse strips rigidly secured in said cover having a notched end and a beveled end, members removably embracing said strips each having a beveled portion engaging the notch in the strip and adapted to engage one wall of the box, and nuts threaded on the fastening screws and beveled to engage the beveled ends of the strips and beveled on the opposite side to engage the beveled wall of the box.

11. A cover for outlet boxes having screw holes therethrough, fastening screws, transverse strips rigidly secured in said cover having a notched end and a beveled end, and a raised lug on the inner edge adjacent to the notch, extension members straddling said strips and engaging said lug and having a beveled bent end to engage said notch, said extension members projecting beyond the beveled end of the strip, and nuts each having a beveled portion engaging the beveled end of the strip and loosely held between the projecting ends of said extension members, and a beveled side adapted to engage the side of the box in locking contact.

In testimony whereof, we have hereunto signed our names at Syracuse, in the county of Onondaga, and State of New York, this 29th of March, 1922.

JOHN T. PEARSON.
RAYMOND H. OLLEY.